(12) United States Patent
Ueda et al.

(10) Patent No.: US 11,087,486 B2
(45) Date of Patent: Aug. 10, 2021

(54) LANE SPECIFICATION METHOD AND LANE SPECIFICATION DEVICE

(71) Applicant: PANASONIC INTELLECTUAL PROPERTY MANAGEMENT CO., LTD., Osaka (JP)

(72) Inventors: Junko Ueda, Kanagawa (JP); Shinji Takenaka, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 115 days.

(21) Appl. No.: 16/300,425

(22) PCT Filed: Feb. 17, 2017

(86) PCT No.: PCT/JP2017/005875
§ 371 (c)(1),
(2) Date: Nov. 9, 2018

(87) PCT Pub. No.: WO2017/199498
PCT Pub. Date: Nov. 23, 2017

(65) Prior Publication Data
US 2019/0096085 A1 Mar. 28, 2019

(30) Foreign Application Priority Data
May 18, 2016 (JP) .............................. JP2016-099368

(51) Int. Cl.
*G06T 7/70* (2017.01)
*H04N 7/18* (2006.01)
(Continued)

(52) U.S. Cl.
CPC ............ *G06T 7/70* (2017.01); *G06K 9/00798* (2013.01); *G06T 7/12* (2017.01); *H04N 7/18* (2013.01); *G06T 2207/30256* (2013.01)

(58) Field of Classification Search
CPC ... G06T 7/70; G06T 7/12; G06T 2207/30256; G06T 7/60; G06K 9/00798;
(Continued)

(56) References Cited

U.S. PATENT DOCUMENTS

| 2003/0072471 A1* | 4/2003 | Otsuka | G06K 9/4604 382/103 |
|---|---|---|---|
| 2006/0106518 A1* | 5/2006 | Stam | B60R 1/04 701/49 |
| 2016/0012300 A1* | 1/2016 | Tsuruta | G06K 9/6215 382/104 |

FOREIGN PATENT DOCUMENTS

| EP | 1304607 A1 | 4/2003 |
| JP | 2003-123058 | 4/2003 |

(Continued)

OTHER PUBLICATIONS

The Extended European Search Report from the European Patent Office (EPO) dated Feb. 18, 2019 for European Patent Application No. 17798936.5.

(Continued)

*Primary Examiner* — Jianxun Yang
(74) *Attorney, Agent, or Firm* — Greenblum & Bernstein, P.L.C.

(57) ABSTRACT

To precisely specify lane regions that are present in an image. In a situation in which a lane specification device an imaging device, and a swimming pool are present, a processor in the lane specification device according to the present disclosure specifies lane regions that are present in an image on the basis of a pattern in which information obtained on the basis of outlines of objects in the image captured by the imaging device appears in the image. In this manner, it is possible to precisely specify the lane regions that are present in the image.

20 Claims, 8 Drawing Sheets

(51) Int. Cl.
*G06K 9/00* (2006.01)
*G06T 7/12* (2017.01)

(58) Field of Classification Search
CPC ......... G06K 9/6215; G06K 2009/4666; G06K 9/52; H04N 7/18
See application file for complete search history.

(56) References Cited

FOREIGN PATENT DOCUMENTS

| | | |
|---|---|---|
| JP | 2004-046647 | 2/2004 |
| JP | 2016-018540 | 2/2016 |

OTHER PUBLICATIONS

Long Sha et al: "Swimmer Localization from a Moving Camera", 2013 International Conference on Digital Image Computing: Techniques and Applications (DICTA), Nov. 1, 2013 (Nov. 1, 2013), pp. 1-8, XP055549714.

Ruyi Jiang et al: "New Lane Model and Distance Transform for Lane Detection and Tracking" In: "Serious Games", Jan. 1, 2009 (Jan. 1, 2009), Springer International Publishing, Cham 032682, XP055549901.

International Search Report (ISR) from International Searching Authority (Japan Patent Office) in International Pat. Appl. No. PCT/JP2017/005875, dated May 16, 2017.

* cited by examiner 302 304

LANE SPECIFICATION METHOD AND LANE SPECIFICATION DEVICE

TECHNICAL FIELD

The present disclosure relates to a lane specification method and device.

BACKGROUND ART

In the related art, a mobile body tracking device that tracks a mobile body in a moving video is known. According to a technology described in PTL 1, for example, a predicted position of a mobile body in a frame image obtained this time is obtained on the basis of positional information of the mobile body in a frame image obtained in the past. Then, candidate objects that have a predetermined feature specific to the mobile body are extracted from image data of the frame image obtained this time, and a candidate object that is located at the closest position to the predicted position from among the extracted candidate objects is assigned as the mobile body.

CITATION LIST

Patent Literature

PTL 1: Japanese Patent Unexamined Publication No. 2004-46647

SUMMARY OF THE INVENTION

The present disclosure relates to a method and a device for precisely specifying lane regions that are present in an image.

In lane specification method and device according to the present disclosure, a processor specifies lane regions that are present in an image on the basis of a pattern in which information obtained based on outlines of objects in the image appears in the image.

The lane specification method and the lane specification device according to the present disclosure are effective for precisely specifying the lane region that is present in the image.

DESCRIPTION OF EMBODIMENTS

Hereinafter, embodiments will be described in detail with reference to drawings as needed. However, there will also be cases in which unnecessarily detailed description is omitted. For example, there will be cases in which detailed description of matters that have already been well-known or overlapping description for substantially the same configurations are omitted. This is for avoiding the following description from being unnecessarily redundant and for facilitating understanding of those skilled in the art.

Note that the present inventor(s) will provide the accompanying drawings and the following description for sufficient understanding of the present disclosure by those skilled in the art, and these are not intended to limit the subject matter described in the claims.

First Embodiment

Hereinafter, a first embodiment will be described with reference to FIGS. 1 to 8.

[1-1. Configuration]

Figure 1:
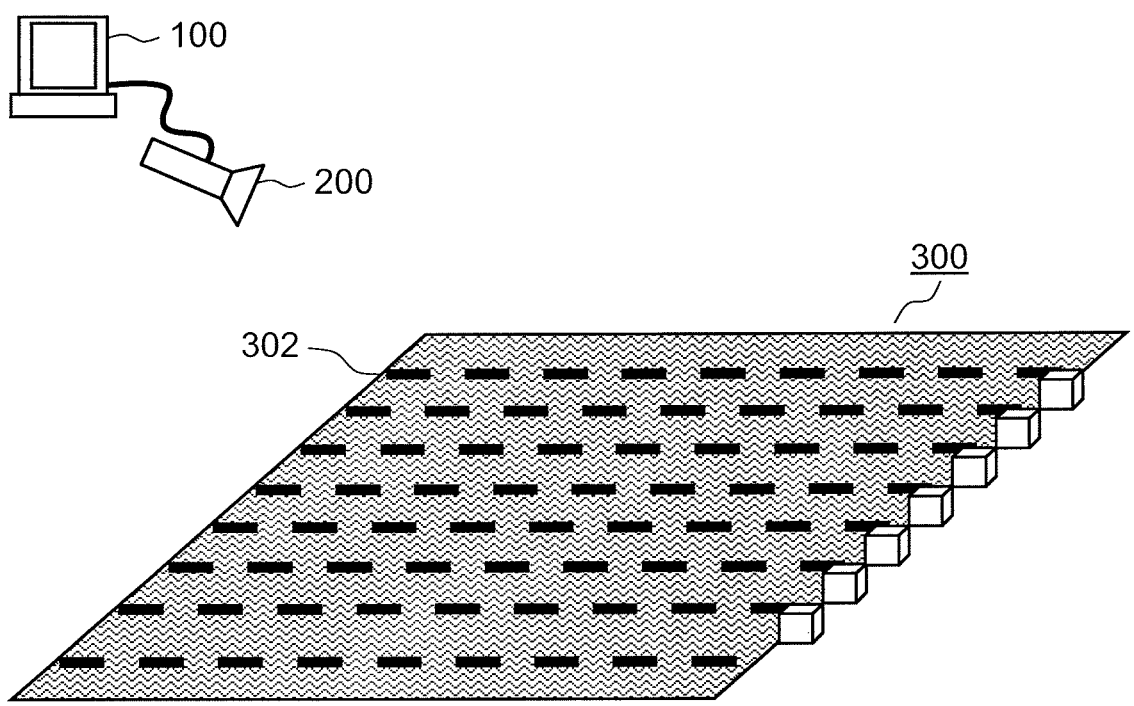
FIG. 1 is a diagram illustrating how a lane specification device according to a first embodiment is used.

FIG. 1 is a diagram illustrating how a lane specification device is used according to the first embodiment.

Lane specification device 100 is realized by installing a lane specification program on a general-purpose computer. Lane specification device 100 is connected to imaging device 200 in such a manner in which it is possible to communicate with imaging device 200. Lane specification device 100 may be a dedicated built-in device or may be configured as hardware.

Imaging device 200 is a video camera. Imaging device 200 images swimming pool 300 in a bird's eye view as illustrated in FIG. 1. Moving image or an image that imaging device 200 has captured is transmitted to lane specification device 100.

Swimming pool 300 has a plurality of lanes. A plurality of lane marks 302 are stretched across swimming pool 300. Note that although a reference numeral is given only to a lane mark at the top in FIG. 1, the broken lines in FIG. 1 represent the lane marks. Lane marks 302 are marks that sections lanes. A swimming pool will be described as an example of an arena in the embodiment. The present disclosure is adapted to precisely obtain a lane region that has a lane. Therefore, the target in which the lane region is specified is not limited to the swimming pool. For example, the present disclosure can be used for specifying lanes in a running track, a road, or the like. However, it is possible to more precisely specify the lane regions in a case in which the size of the target in which the lane regions have been specified or the number of the lanes are specified or assumed as will be described later. In addition, the present disclosure preferably enables specification of lane regions in an image in which ripple or light reflection tends to appear, such as an image obtained by imaging a swimming pool, in particular.

Figure 2:
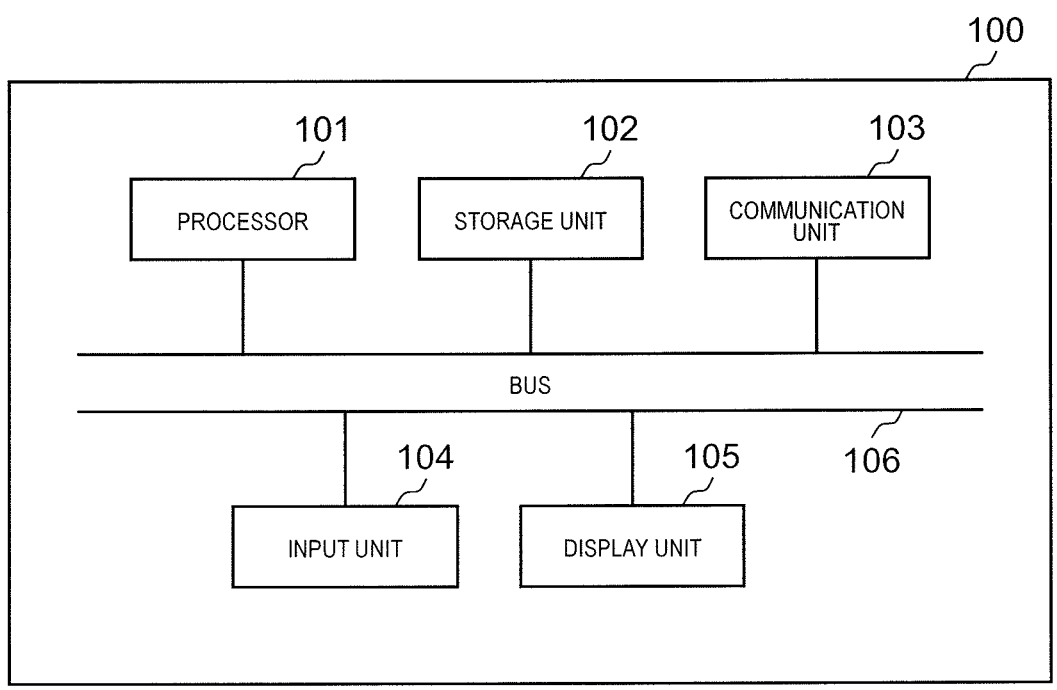
FIG. 2 is a diagram illustrating a configuration of the lane specification device according to the first embodiment.

FIG. 2 is a diagram illustrating a configuration of the lane specification device according to the first embodiment.

Lane specification device 100 has processor 101, storage unit 102, communication unit 103, input unit 104, display unit 105, and bus 106.

Processor 101 controls the other components in the lane specification device by performing arithmetic operations.

Storage unit 102 temporarily or permanently stores information. Storage unit 102 corresponds to a read only memory (ROM), a random access memory (RAM), or the like in the lane specification device. Lane specification device 100 may be provided with a plurality of storage units 102 in accordance with a purpose of use or necessity of an access speed. It is also possible to configure storage units 102 by applying a hard disc drive (HDD), a synchronous dynamic random access memory (SDRAM), a solid state drive (SSD), or the like.

Communication unit 103 is an interface that connects lane specification device 100 to imaging device 200. Communication unit 103 may be a wired connection interface or a wireless connection interface. Communication unit 103 is for transmitting a moving image or an image captured by imaging device 200 to lane specification device 100. Therefore, communication unit 103 is not an essential configuration in a case in which the moving image or the image is moved from imaging device 200 to lane specification device 100 by using a storage medium.

Input unit 104 receives signals from the outside. Input unit 104 corresponds to an input device, an input interface, or the like of lane specification device 100. It is possible to configure input unit 104 by applying an input device such as a mouse or a keyboard or an input interface such as a communication port or a wireless communication device.

Display unit 105 displays information for the outside. It is possible to configure display unit 105 by applying a liquid crystal display or the like.

Bus 106 is a route for connecting the respective elements that configure lane specification device 100. It is possible to configure bus 106 inside processor 101 by merging bus 106 with processor 101. Bus 106 may connect the respective elements in a wired manner or may connect the respective elements in a wireless manner.

The configuration of lane specification device 100 described above is an example. Therefore, lane specification device 100 may be configured by adding other components to the configuration described above. In addition, lane specification device 100 may be configured by deleting a part of the components from the configuration described above as needed. In addition, lane specification device 100 may be configured by mutually merging the components described above. In addition, lane specification device 100 may be configured by separating the components into the components as described above.

[1-2. Operations]

Operations of lane specification device 100 described above will be described. Note that lane specification device 100 operates mainly by processor 101 executing a program in corporation with the respective elements in lane specification device 100.

Figure 3:
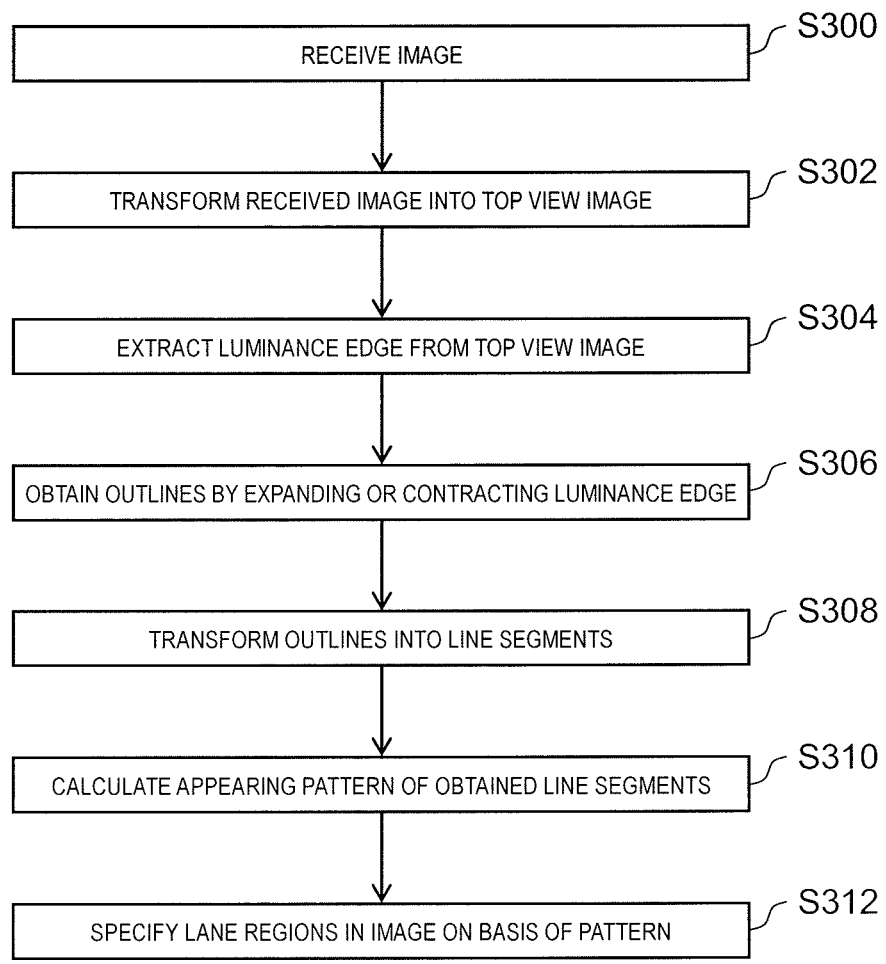
FIG. 3 is a flowchart for describing operations of the lane specification device according to the first embodiment.

FIG. 3 is a flowchart for describing operations of the lane specification device according to the first embodiment.

In Step S300, lane specification device 100 receives an image from imaging device 200 via communication unit 103. The received image is an image to be processed by the following operations.

Figure 4:
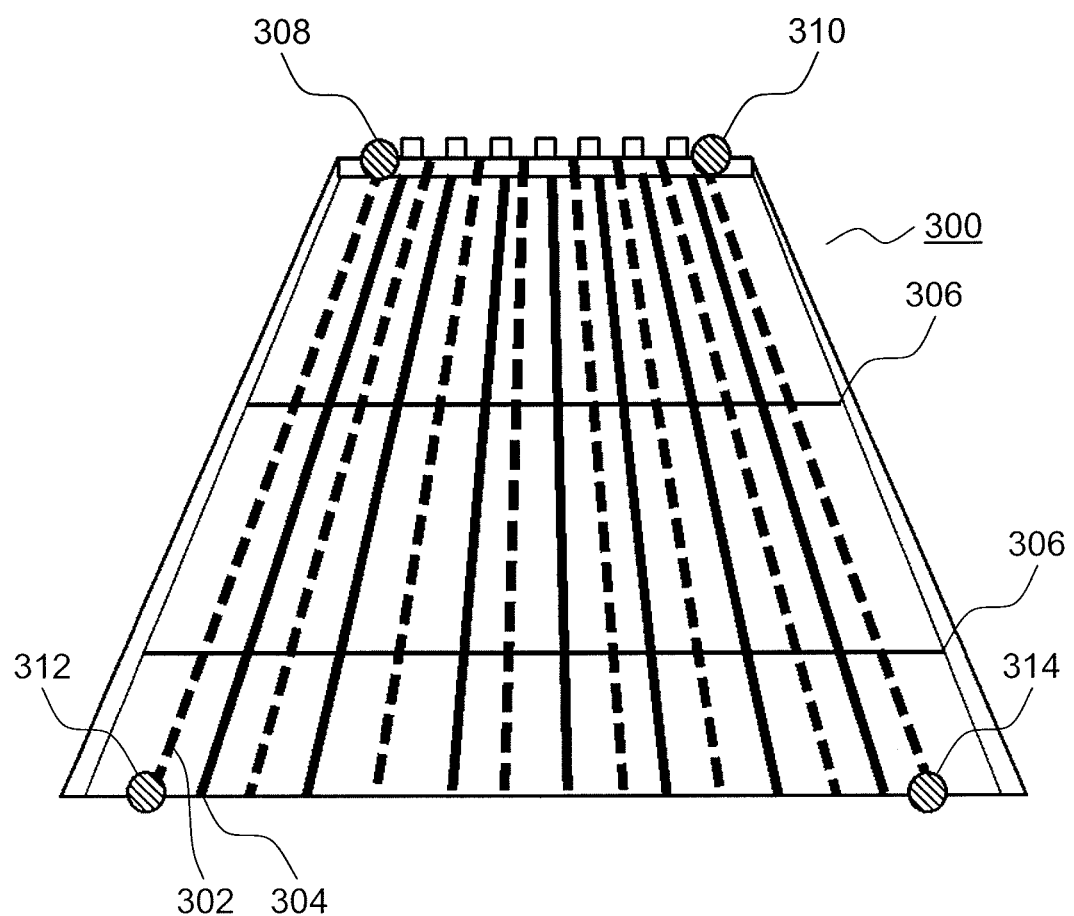
FIG. 4 is a diagram illustrating an image to be processed according to the first embodiment.

FIG. 4 is a diagram illustrating an image to be processed according to the first embodiment. As illustrated in FIG. 1, imaging device 200 images swimming pool 300 in a bird's eye view according to the first embodiment. Therefore, the image captured by imaging device 200 is an image in which swimming pool 300 appears to be widen from the further side toward the closer side as illustrated in FIG. 4.

As is obvious from FIG. 4, a plurality of lane marks 302 are stretched across swimming pool 300 as already described above. Note that although only a reference numeral is provided to the lane mark at the leftmost end in FIG. 4 (the same applies to FIG. 5), the broken lines in FIG. 4 (the same applies to FIG. 5) represents lane marks.

As illustrated in FIG. 4, lane lines 304 representing the centers of the lanes are drawn on the bottom surface of the swimming pool. Note that although a reference numeral is provided to the lane line at the leftmost end in FIG. 4 (the same applies to FIG. 5), the solid lines that are adjacent to lane marks 302 in FIG. 4 (the same applies to FIG. 5) represents lane lines. In addition, cross lines 306 that perpendicularly intersect lane lines 304 are also drawn on the bottom surface of the swimming pool.

In Step S302, processor 101 transforms the image received in Step S300 into a top view image.

The top view image is an image with a structure (plan view) that is obtained when an object is viewed from the upper side. As illustrated in FIG. 4, the image captured by imaging device 200 is an image in which swimming pool 300 appears to be widened from the further side to the closer side. Swimming pool 300 originally has a square shape in a plan view. In the embodiment, processor 101 transforms the image illustrated in FIG. 4 into a top view image for facilitating later image processing. This processing is not an essential processing since this processing is performed in order to facilitate the later image processing. The transform of the image into the top view image will be referred to as top view transform.

As a method of performing the top view transform, a known method can be appropriately applied. In the embodiment, an example in which a method of performing the top view transform by using trapezoidal correction is applied will be described. First, a user of lane specification device 100 designates coordinates of four corners of the swimming pool warped into a trapezoidal shape by using input unit 104. For example, the user designates coordinates 308, coordinates 310, coordinates 312, and coordinates 314 as the coordinates of the four corners in FIG. 4. In the embodiment, coordinates including the lane marks are designated as the coordinates of the four corners. In this manner, processing in Step S310, which will be described later, is facilitated. Specifically, it is possible to facilitate the processing in Step S310 by employing intersecting points between objects (lane marks or sides of the swimming pool) that pass across the swimming pool and the closer end of the front-back direction of the swimming pool as locations designated as the coordinates of the four corners. Processor 101 generates a coordinate transform matrix such that the coordinates of the designated four points form a square shape. Processor 101 can obtain a top view image by transforming the coordinates of pixels inside the coordinates of the four corners by using the generated transform matrix.

Figure 5:
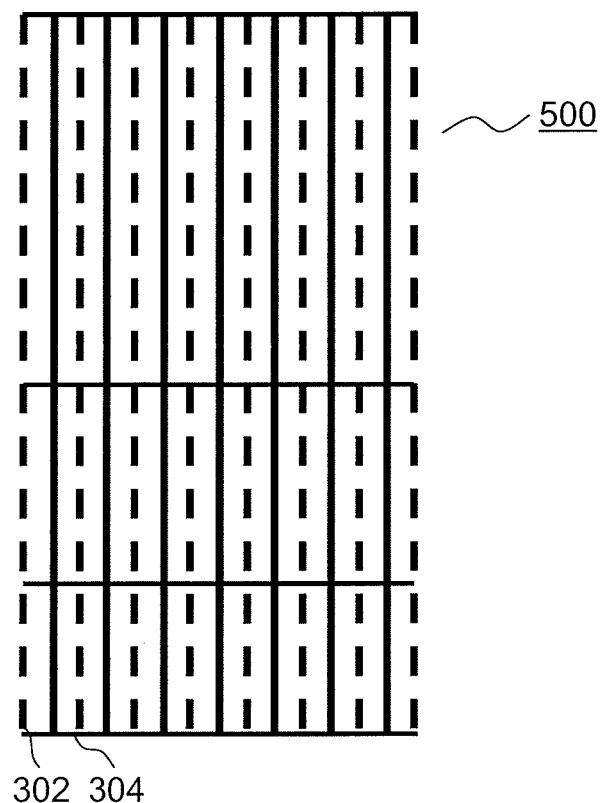
FIG. 5 is a top view image according to the first embodiment.

FIG. 5 is a diagram illustrating the top view image according to the first embodiment. As described above, processor 101 transforms the image captured by imaging device 200 into top view image 500. Note that it is also possible to omit the top view transform even in a case in which imaging device 200 is installed at a location at which imaging device 200 captures an image in a plan view. Also, it is not necessary that the top view transform be performed by processor 101 in lane specification device 100. It is also possible to obtain a result that is similar to that of the aforementioned operations by another processing device performing the top view transform and transmitting the image after the top transform to the lane specification device.

In Step S304, processor 101 extracts a luminance edge from the top view images transformed in Step S302. Note that the luminance edge is extracted from the image received in Step S300 in the case in which the top view transform is omitted.

The luminance edge means a location at which luminance of pixels forming the image steeply changes in the image.

Typical examples of the location at which the luminance of the pixels steeply changes include outlines of objects.

In Step S306, processor 101 obtains the outlines of the object by causing the luminance edge extracted in Step S304 to be expanded or contracted. If the luminance edge is extracted from an actual video image, the outlines of the actual objects have linear shapes while the luminance edge is often obtained as sparse points in the image. In the embodiment, the following processing is performed such that the luminance edge is caused to approach the actual outlines of the objects. First, if there is at least one pixel obtained as the luminance edge in a region within a predetermined range in the surroundings of a specific pixel in the image from which the luminance edge has been extracted, processor 101 replaces the entire region with luminance edge pixels (expansion processing). Next, if at least one luminance edge pixel is missing in the region within a predetermined range of a group of luminance edge pixels coupled through the expansion, processor 101 deletes the region from the luminance edge pixels (contraction processing). The luminance edge pixels expanded or contracted in this manner more precisely reproduce the outlines of the objects. Note that the luminance edge pixels more precisely reproduce the outlines of the objects by performing the expansion processing and the contraction processing a plurality of times rather than performing them once.

Note that the processing in Step S304 and Step S306 can be appropriately applied as long as the processing can extract the outlines of the objects. For example, the outlines of the objects may be extracted by using a change in color information in the pixels, or the outlines of the objects may be obtained by using a distance sensor.

In Step S308, processor 101 transforms the outlines of the objects obtained in Step S306 into line segments. As a method of transforming a group of points in the image into the line segments in the image, a known algorithm called probabilistic Hough transform is used. The coordinates of the groups of points that form lines with deviation or strain are converted into coordinates that form smooth lines in the image by using the probabilistic Hough transform. In the embodiment, the outline in the image is obtained as smooth line segments by performing the probabilistic Hough transform on the points that form the outlines of the objects obtained in Step S306. Note that the method of obtaining the line segments is not limited to the probabilistic Hough transform. For example, the line segments may be obtained by applying a feathering filter to the outlines of the objects. In addition, the line segments may be obtained by further repeating the aforementioned expansion and contraction processing on the outlines of the objects. In addition, the processing in Step S308 may be omitted in a case in which an outline with sufficient quality that can be regarded as line segments has been obtained in the processing until Step S306. In addition, information to be obtained until Step S308 is completed is not limited to the line segments in the present disclosure. The information to be obtained until Step S308 is completed may be information that can be used as a target of processing in Step S310 and the following steps. The information to be obtained until Step S308 is completed may be straight lines that include a part of the outlines of the objects, or it is a matter of course that the information may be curved lines. In other cases, the information may be a chain-shaped patter or a net-shaped pattern. However, there is an advantage that the amount of calculation in the following processing can be reduced if the lines are obtained from the image on the basis of the outlines of the objects as in the embodiment. Note that a concept including line segments, straight lines, and curved lines is simply referred to as lines in the present disclosure.

As described above, it is possible to obtain the line segments as information from the outlines of the objects in the top view image according to the embodiment.

Figure 6:
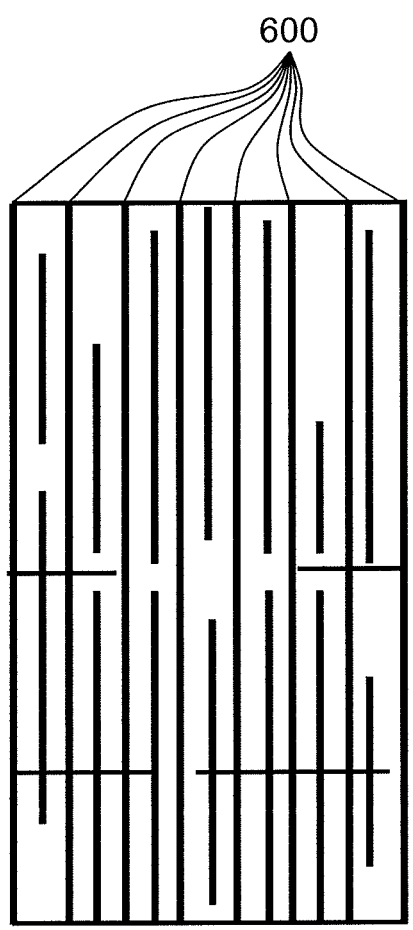
FIG. 6 is a diagram illustrating how outlines of objects in a top view image are transformed into line segments according to the first embodiment.

FIG. 6 is a diagram illustrating how the outlines of the objects in the top view image are transformed into line segments according to the first embodiment. The present inventors have confirmed that it is possible to clearly extract lines 600, which have been obtained by transforming the outlines of the lane marks and the pool sides if the aforementioned processing is performed as illustrated in FIG. 6. Lines that include line segments that appear at coordinates that coincide with locations at which objects that section lanes are present (such as lane marks and the pool sides) in the image in this manner are referred to as lines that represent objects that section the lanes. Meanwhile, it is difficult to faithfully extract the outlines of the lane lines and the cross lines due to influences of water surface reflection and waves as illustrated in FIG. 6.

Note that final line segments are obtained by deleting a part of a group of the line segments that have been primarily obtained in Step S308 on the basis of the size of the swimming pool (arena) in the embodiment. Specifically, processor 101 performs processing of not regarding line segments with lengths that are less than a value, which is obtained by dividing the size (length) of the swimming pool (arena) in an advancing direction in the image by a predetermined value (8 in the embodiment) as line segments and deleting the line segments with such lengths. In this manner, it is possible to remove line segments that are not likely to be the outlines of the objects that section the lanes in the arena from the final line segments. Therefore, it is possible to improve precision with which the lane regions are specified.

In Step S310, processor 101 calculates an appearance pattern of the line segments obtained in Step S308 in the image.

In the present disclosure, it is assumed that the objects (the lane marks and the pool sides) that section the lanes appear on the basis of a predetermined pattern. The predetermined pattern means a pattern caused by intervals between the lanes. For example, the lane marks are stretched at equal intervals in the swimming pool, and while lines are also drawn in a running track or a road. In the present disclosure, coordinates of the objects that section the lanes are specified by calculating the pattern, and the regions between the objects that section the lanes are respectively specified as the individual lanes.

However, there are various straight lines obtained in Step S308 other than the lines 600, as illustrated in FIG. 6. The purpose of performing Step S310 is to specify the lines 600 that appear in accordance with the predetermined pattern, from among the line segments.

Figure 7:
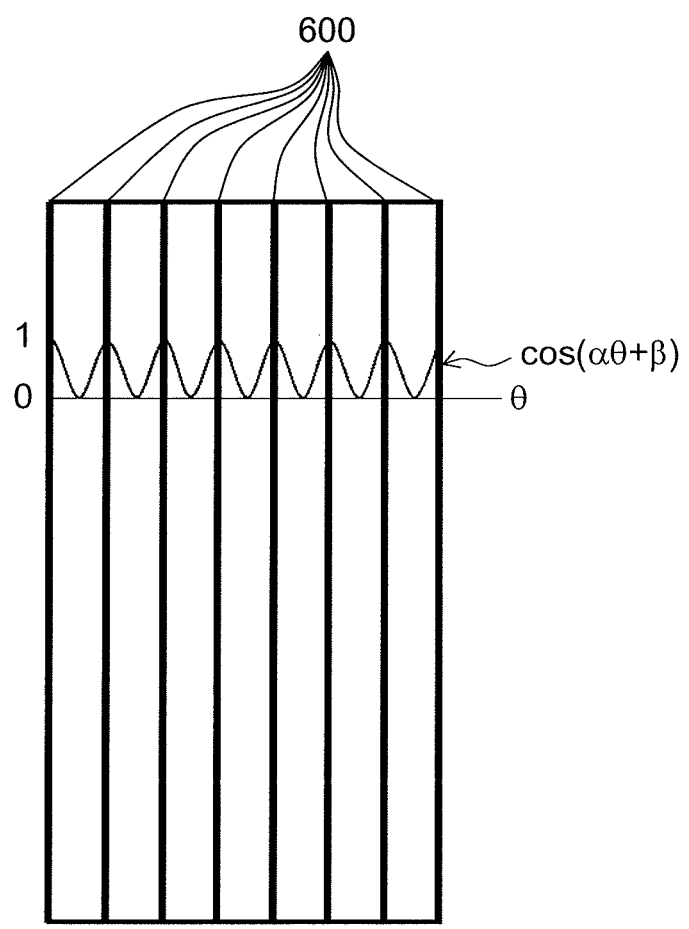
FIG. 7 is a diagram illustrating a concept of calculating a pattern according to the first embodiment.

Various methods to calculate the appearing pattern are considered. FIG. 7 is a diagram illustrating a concept of calculating the pattern according to the first embodiment. As illustrated in FIG. 7, the pattern is calculated by using the following equation in which the coordinates (the left end of the image is regarded as 0) in the horizontal direction and the coordinates in the horizontal direction after the top view transform are defined as an angle and a triangular ratio, respectively, according to the embodiment.

$$\cos(\alpha\theta+\beta) \qquad \text{(Equation 1)}$$

$\alpha$ and $\beta$ are obtained such that (Equation 1) results in values that are close to 1 (peak) in the horizontal coordinates (θ), at which lines 600 appear, as much as possible. Then, (Equation 1) into which α and β obtained are substituted is used as an equation for calculating the appearing pattern.

Specifically, a method of obtaining α and β as illustrated in FIG. 7 will be described. First, the value of α is defined on the basis of a parameter that is set on the assumption of the number of lanes that are present in the image. Specifically, the value is defined on the basis of the following equation.

$$\alpha = \text{(the number of assumed lanes)} \times 360 \div \text{(the width of the top view image in the horizontal direction)} \quad \text{(Equation 2)}$$

Processor 101 generates a graph with peaks corresponding to the number of assumed lanes+1 on the basis of (Equation 1) by defining the value of (Equation 2). An initial value of the number of assumed lanes may be input from input unit 104 by the user of lane specification device 100, or an initial value recorded in storage unit 102 may be used. Subsequently, the horizontal direction of the graph is adjusted on the basis of (Equation 1) on the assumption that the graph is present with a phase difference β in the horizontal direction in the top view image. An initial value of β is assumed to be zero in the embodiment. Note that if coordinates including the lane marks and the pool sides have been designated as the coordinates of the four corners in the top view transform, a true value of β approaches 0, thereby the processing in Step S310 is preferably performed. The processing in Step S310 can be preferably performed if the image capturing is performed such that the lane marks and the pool sides appear at the left end of the image even when the top view transform is not performed. Then, processor 101 performs an arithmetic operation to obtain $$\Sigma |\cos(\alpha\theta + \beta)| \quad \text{(Equation 3)}$$

by using the respective coordinate values θ of all the lines, which have been obtained in Step S308, in the horizontal direction.

Note that the value of θ may be a value of coordinates at the center of both end points of all the lines, which have been obtained in Step S308, in the horizontal direction. In this manner, since lines that are nearly parallel to the advancing direction of the lanes, such as lines 600 obtained by transforming the outlines of the lane marks and the pool sides into line segments, are treated as lines representing the horizontal coordinates (horizontal coordinates with periodicity) of the entire lane marks while lines that perpendicularly intersect the advancing direction of the lanes (for example, lines based on the outlines of the cross lines) have θ that tends to be a random value with no periodicity, the values of α and β tend to be more precisely obtained.

Processor 101 obtains the value of (Equation 3) for the initial values of α and β and then obtains the value of (Equation 3) for a value of α or β that is different from the initial values. Specifically, processor 101 obtains the value of (Equation 3) by changing α into a value within a possible range of the number of lanes, which is about the initial value ±2. Since the typical number of lanes is from six to 10 in the example of the swimming pool, α may be changed in the range. In addition, processor 101 obtains the value of (Equation 3) by changing β into a value within a range from −30 (degrees) to +30 (degrees). Processor 101 obtains the value of (Equation 3) for all the combinations of α and β and then specifies a combination of α and β, which results in the largest value. (Equation 1) in which α and β that have been specified in this manner are substituted is used as an equation for calculating the appearing pattern.

Note that in a case in which the user of lane specification device 100 has input the possible largest number of lanes via input unit 104 in advance, the calculation of (Equation 3) may be performed on the assumption that a is not a value that is equal to or less than a half of the largest number. This is because the possibility that the outlines of the lane lines are erroneously recognized as information representing the objects sectioning the lanes (lines 600 obtained by transforming the outlines of the lane marks and the pool sides into the line segments) decreases in this manner in a case in which the lane lines are drawn at the centers of the lanes as in the embodiment. The lower limit value of such a may be obtained by processor 101 from the possible largest number of lanes as described above or may be input by the user of lane specification device 100 to lane specification device 100 via input unit 104.

Note that the aforementioned processing is not necessarily performed by lane specification device 100. In the present disclosure, lane specification device 100 may be any device as long as it specifies the lane regions that are present in the image on the basis of the patterns obtained until Step S310. That is, lane specification device 100 may perform the processing in Step S312 and the following steps after acquiring, from the communication unit 103, the pattern obtained by another processing device performing processing that is equivalent to the processing until Step S310. Further, the method of calculating the pattern is also not limited to the one described in the description about Step S310. The pattern according to the present disclosure may be any pattern in which the outlines of the object appear, and in a case in which complicated figures other than lines are regarded as the outlines of the objects, the pattern may be calculated by using another known method such as spectral analysis.

Figure 8:
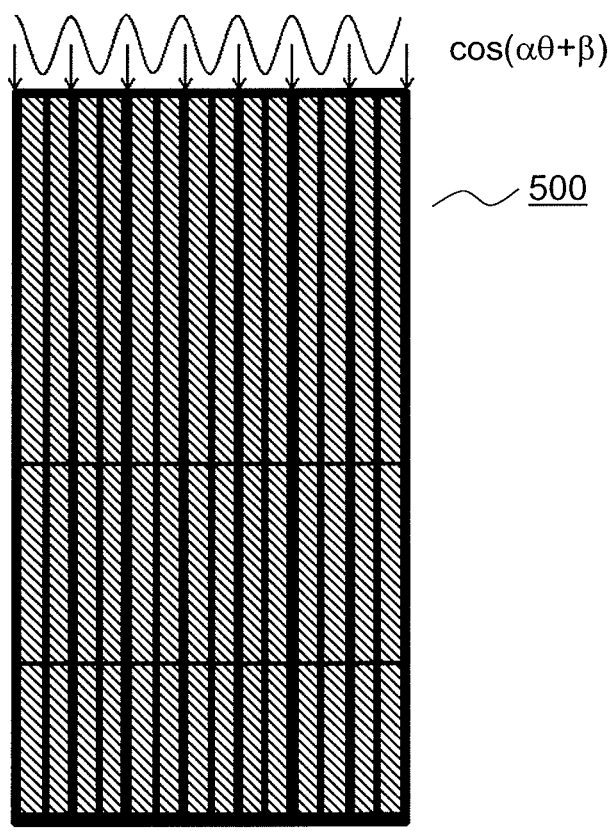
FIG. 8 is a diagram illustrating how a lane region has been specified on a basis of the calculated pattern in the top view image according to the first embodiment.

In Step S312, processor 101 specifies the lane regions in the image on the basis of the pattern calculated in Step S310. FIG. 8 is a diagram illustrating how the lane regions have been specified on the basis of the calculated pattern in the top view image according to the first embodiment. Processor 101 synchronizes horizontal coordinates of the calculated pattern with horizontal coordinates of top view image 500 and specifies, as a lane, a region in top view image 500 that has horizontal coordinates that are present between a peak (the starting point of the arrow in FIG. 8) of the calculated pattern and the adjacent pattern. Since the pattern has eight peaks in FIG. 8, a total of seven lanes have been specified. Note that the image in which the lane regions are specified is not limited to the top view image. For example, it is also possible to specify the lanes in the image captured by imaging device 200 by performing processing that is opposite to the processing in Step S302 on the top view image illustrated in FIG. 8.

As described above, the specified lane regions can be utilized in various modes. For example, it is possible to facilitate editing operations of a person who is in charge of the video image editing operations, or it is possible to provide a strong realistic sensation to views of the video image, by displaying the lane regions with respectively different colors when top view image 500 or the image captured by imaging device 200 is displayed on display unit 105. In a case in which attributes of a person or an object that is present in a specific lane are known, it is possible to emphasize which person or object is present in which lane, by displaying the attributes so as to be overlaid on the lane region. In a case in which a person or an object that is present in a lane is tracked by using an image recognition technology, it is also possible to specify attributes of the person or the object that is being tracked, by specifying which lane region the person or the object that is being tracked is present.

Note that although the example in which imaging device 200 is installed at a position at which the lanes of swimming pool 300 appear in the longitudinal direction has been described in the embodiment, imaging device 200 may be installed at a position at which the lanes of swimming pool 300 appear in the lateral direction. In that case, the processing in Step S304 and the following steps can be similarly performed if transform for rotating the image by 90 degrees is added along with the trapezoidal correction when the image received in Step S300 is transformed into the top view image in Step S302.

[1-3. Effects and the Like]

As described above, processor 101 in lane specification device 100 specifies the lane regions that are present in the image on the basis of the pattern in which the information that is obtained on the basis of the outlines of the objects in the image appear, in the embodiment.

In this manner, it is possible to precisely specify the lane regions that are present in the image.

In addition, the objects in the image are objects that section the lanes in the embodiment.

In this manner, the lane regions are specified on the basis of the appearing pattern of the objects that actually section the lane regions. Therefore, it is possible to more precisely specify the lane regions that are present in the image.

In the embodiment, the information obtained on the basis of the outlines of the objects in the image is lines representing the objects that section the lanes. Since the precision of calculating the pattern is improved in this manner, it is possible to more precisely specify the lane regions that are present in the image.

In the embodiment, the lines representing the objects that section the lanes are obtained on the basis of the size of the arena that is present in the image. It is possible to exclude lines caused by noise in the image in this manner and to thereby more precisely specify the lane regions that are present in the image.

In the embodiment, the pattern is calculated on the basis of the parameter that assumes the number of the lanes that are present in the image. In this manner, it is possible to exclude information that is unfavorable for the calculation of the pattern, from the information obtained on the basis of the outlines of the objects. Therefore, it is possible to more precisely specify the lane regions that are present in the image.

As described above, the embodiment has been described as an example of the technologies of the present disclosure. For this reason, the accompanying drawings and the detailed description has been provided.

Therefore, the components illustrated in the accompanying drawings and the detailed description can include not only components essential for solving the problems but also components that are not essential for solving the problems in order to describe the above technologies as an example. Therefore, the components that are not essential should not be immediately recognized as being essential on the basis of the illustration of the components, which are not essential, in the accompanying drawings and the detailed description.

Also, since the aforementioned embodiment is for describing the technologies of the present disclosure as an example, various modifications, replacements, additions, omissions, and the like may be made within the scope of the claims or a scope equivalent thereto.

INDUSTRIAL APPLICABILITY

The present disclosure can be applied to a method or a device for specifying lane regions in a video image. For example, it is possible to apply the present disclosure to a computer for handling analysis of a video image or the like of a sport.

REFERENCE MARKS IN THE DRAWINGS

100 LANE SPECIFICATION DEVICE
101 PROCESSOR
102 STORAGE UNIT
103 COMMUNICATION UNIT
104 INPUT UNIT
105 DISPLAY UNIT
106 BUS
200 IMAGING DEVICE
300 SWIMMING POOL
302 LANE MARK
304 LANE LINE
306 CROSS LINE
308 COORDINATES
310 COORDINATES
312 COORDINATES
314 COORDINATES
500 TOP VIEW IMAGE
600 LINE

The invention claimed is:

1. A lane specification method for specifying lane regions that are present in an image by a processor, the lane specification method comprising:
   detecting, by the processor, lines from the image;
   calculating, by the processor, patterns, each reflecting a mathematical function and having peaks at equal intervals in a direction in which lanes are aligned, a width of the equal intervals in the patterns being changed according to candidate values of a parameter of the mathematical function, a number of the peaks at the equal intervals being different for each of the patterns as a result of the width of the equal intervals being changed according to the candidate values of the parameter of the mathematical function;
   selecting, by the processor, a value of the parameter from among the candidate values, so that the peaks of a pattern corresponding to the selected value best match with the detected lines, among the patterns which are changed according to the candidate values;
   specifying, by the processor, ones of the detected lines matching the peaks of the pattern corresponding to the selected value of the parameter, as lane lines representing lane marks sectioning the lanes; and
   specifying, by the processor, the lane regions in the image based on the specified lane lines representing the lane marks.

2. The lane specification method of claim 1,
wherein objects in the image are specified by the pattern, the objects sectioning the lanes.

3. The lane specification method of claim 2,
wherein the value of the parameter is selected using information obtained based on an appearance pattern of line segments in the image, the line segments including outlines of the objects in the image that section the lanes.

4. The lane specification method of claim 3,
wherein the line segments are obtained from the image based on a size of an arena that is present in the image.

5. The lane specification method of claim 1,
wherein the patterns are further calculated based on a second parameter, one of the candidate values of the parameter and candidate values of the second parameter assuming a number of the lanes that are present in the image.

6. The lane specification method of claim 1,
wherein horizontal coordinates of the patterns are synchronized with horizontal coordinates of the image.

7. The lane specification method of claim 1,
wherein the candidate values of the parameter are within a range of a possible number of lanes.

8. The lane specification method of claim 1,
wherein the mathematical function includes a second parameter which changes positions of the peaks, and
in the selecting of the value of the parameter, the processor also selects a second value of the second parameter from among second candidate values of the second parameter.

9. The lane specification method of claim 1,
wherein, in the selecting of the value of the parameter, the processor evaluates an output value obtained by inputting positions of the detected lines in the image into the mathematical function with each of the candidate values of the parameter.

10. The lane specification method of claim 1,
wherein the processor detects the lines within an outline of an object in the image, and
the patterns, each reflecting the mathematical function, have the peaks at the equal intervals in the direction in which the lanes are aligned, with the lanes being aligned within the outline of the object.

11. The lane specification method of claim 1,
wherein, in the specifying, the processor does not specify ones of the detected lines that do not match the peaks of the pattern corresponding to the selected value of the parameter, as the lane lines representing the lane marks sectioning the lanes.

12. A lane specification device for specifying lane regions that are present in an image, the lane specification device comprising:
a processor; and
a memory including a program that, when executed by the processor, causes the processor to perform operations, the operations including:
detecting lines from the image;
calculating patterns, each reflecting a mathematical function and having peaks at equal intervals in a direction in which lanes are aligned, a width of the equal intervals in the patterns being changed according to candidate values of a parameter of the mathematical function, a number of the peaks at the equal intervals being different for each of the patterns as a result of the width of the equal intervals being changed according to the candidate values of the parameter of the mathematical function;
selecting a value of the parameter from among the candidate values, so that the peaks of a pattern corresponding to the selected value best match with the detected lines, among the patterns which are changed according to the candidate values;
specifying ones of the detected lines matching the peaks of the pattern corresponding to the selected value of the parameter, as lane lines representing lane marks sectioning the lanes; and
specifying the lane regions in the image based on the specified lane lines representing the lane marks.

13. The lane specification device of claim 12,
wherein objects in the image are specified by the pattern, the objects sectioning the lanes.

14. The lane specification device of claim 13,
wherein the value of the parameter is selected using information obtained based on an appearance pattern of line segments in the image, the line segments including outlines of the objects in the image that section the lanes.

15. The lane specification device of claim 14,
wherein the line segments are obtained from the image based on a size of an arena that is present in the image.

16. The lane specification device of claim 12,
wherein the patterns are further calculated based on a second parameter, one of the candidate values of the parameter and candidate values of the second parameter assuming a number of the lanes that are present in the image.

17. The lane specification device of claim 12,
wherein horizontal coordinates of the patterns are synchronized with horizontal coordinates of the image.

18. The lane specification device of claim 12,
wherein the candidate values of the parameter are within a range of a possible number of lanes.

19. The lane specification device of claim 12,
wherein the mathematical function includes a second parameter which changes positions of the peaks, and
in the selecting of the value of the parameter, the processor also selects a second value of the second parameter from among second candidate values of the second parameter.

20. The lane specification device of claim 12,
wherein, in the selecting of the value of the parameter, the processor evaluates an output value obtained by inputting positions of the detected lines in the image into the mathematical function with each of the candidate values of the parameter.

* * * * *